United States Patent
Munevar et al.

(10) Patent No.: US 10,876,497 B2
(45) Date of Patent: Dec. 29, 2020

(54) METHOD FOR FAST THERMALIZATION AND THERMAL MANAGEMENT OPERATION OPTIMIZATION

(71) Applicant: Rolls-Royce North American Technologies Inc., Indianapolis, IN (US)

(72) Inventors: Erik A. Munevar, Indianapolis, IN (US); Eric S. Donovan, Fishers, IN (US); Ken S. Rubel, Indianapolis, IN (US)

(73) Assignee: ROLLS-ROYCE NORTH AMERICAN TECHNOLOGIES INC., Indianapolis, IN (US)

( * ) Notice: Subject to any disclaimer, the term of this patent is extended or adjusted under 35 U.S.C. 154(b) by 306 days.

(21) Appl. No.: 15/865,625

(22) Filed: Jan. 9, 2018

(65) Prior Publication Data

US 2019/0055899 A1    Feb. 21, 2019

Related U.S. Application Data

(60) Provisional application No. 62/547,522, filed on Aug. 18, 2017.

(51) Int. Cl.
*F02G 5/02* (2006.01)
*F02B 29/04* (2006.01)
(Continued)

(52) U.S. Cl.
CPC ............... *F02G 5/02* (2013.01); *F01N 5/02* (2013.01); *F02B 29/0412* (2013.01);
(Continued)

(58) Field of Classification Search
CPC .... F02G 5/02; F02B 29/0412; F02B 29/0443; F41H 13/0068; F01N 5/02
See application file for complete search history.

(56) References Cited

U.S. PATENT DOCUMENTS 3,657,881 A * 4/1972 Amann ............... F02C 9/54
60/794
4,498,525 A * 2/1985 Smith ................. F02C 7/14
123/552

(Continued)

OTHER PUBLICATIONS

Latz, Gunnar, "Waste Heat Recovery from Combustion Engines based on the Rankine Cycle," 2016, pp. 1-116, Thesis for the Degree of Doctor of Philosophy in Thermo and Fluid Dynamics, Department of Applied Mechanics, Chalmers University of Technology, Gothenburg, Sweden.

(Continued)

*Primary Examiner* — Shafiq Mian
(74) *Attorney, Agent, or Firm* — Brinks Gilson & Lione

(57) ABSTRACT

Systems and methods are provided for decreasing thermalization time and/or increasing coefficients of performance by adding waste heat. A thermal management system may include a coolant loop and be configured to cool a target component via the coolant loop, the thermal management system may be further configured to heat the target component during a thermalization period with a waste heat source via the same coolant loop with which the thermal management system is configured to cool the target component.

14 Claims, 3 Drawing Sheets

(51) Int. Cl.
 *F41H 13/00* (2006.01)
 *F01N 5/02* (2006.01)
 *F02C 6/18* (2006.01)

(52) U.S. Cl.
 CPC ............ *F02B 29/0443* (2013.01); *F02C 6/18* (2013.01); *F41H 13/0068* (2013.01); *F05D 2220/76* (2013.01); *F05D 2260/213* (2013.01); *F05D 2260/4031* (2013.01); *F41H 13/0043* (2013.01)

(56) References Cited

U.S. PATENT DOCUMENTS

| | | | | |
|---|---|---|---|---|
| 5,105,875 | A * | 4/1992 | McArthur | H05K 7/20927 123/41.31 |
| 5,615,547 | A * | 4/1997 | Beutin | F02C 7/14 60/39.08 |
| 9,638,091 | B2 * | 5/2017 | Schwartz | F01P 7/042 |
| 9,759,114 | B2 * | 9/2017 | Schwartz | F01M 5/007 |
| 2012/0112575 | A1 * | 5/2012 | Blewett | H02K 7/1823 310/62 |
| 2012/0143437 | A1 * | 6/2012 | Spohn | F01M 5/001 701/36 |
| 2013/0219872 | A1 | 8/2013 | Gibble et al. | |
| 2014/0124170 | A1 * | 5/2014 | Young | F01P 3/20 165/104.14 |
| 2014/0375064 | A1 * | 12/2014 | Koeneman | F01P 3/00 290/1 A |
| 2015/0096509 | A1 * | 4/2015 | Potter | F16H 57/0475 123/41.33 |

OTHER PUBLICATIONS

Bennion, K., Thornton, M., "Integrated Vehicle Thermal Management for Advanced Vehicle Propulsion Technologies," 2010-01-0836, pp. 1-18, Feb. 2010, Conference Paper NREL/CP-540-47416, National Renewable Energy Laboratory, Center for Transportation Technologies and Systems, Golden, CO.

Sniderman, Debbie, "Using Waste Engine Heat in Automobile Engines," dated Jun. 26, 2017, pp. 1-2, ASME, Retrieved from Internet at URL: https://www.asme.org/engineering-topics/articles/automotive/using-waste-engine-heat-in-automobile-engines.

* cited by examiner

METHOD FOR FAST THERMALIZATION AND THERMAL MANAGEMENT OPERATION OPTIMIZATION This application is a non-provisional application of U.S. provisional patent application 62/547,522, filed Aug. 18, 2017, the entire contents of which are incorporated by reference.

TECHNICAL FIELD

This disclosure relates to thermal management systems and, in particular, the use of waste heat in thermal management systems.

BACKGROUND

In some environments, devices may be subject to extremely cold conditions, which may cause the devices to stop working or to otherwise malfunction. Some standards, such as the United States military standard MIL-STD-810G, require compliant devices to be designed to operate in relatively cold environments. Such standards may specify that devices are to survive extreme cold soak conditions. An extreme cold soak condition may be a condition in which a device remained in an environment that is relatively cold for a relatively long time.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

There is a need for novel architectures and control schemes that operate, and relatively quickly thermalize a system's temperatures, in relatively cold environments. To thermalize the system's temperatures means, for example, to bring the system from a storage condition, a transport condition, and/or an "off" condition to operational temperature(s).

By way of an introductory example, a thermal management system may be provided that includes a coolant loop, where the thermal management system may cool a target component via the coolant loop, and the thermal management system may heat the target component during a thermalization period with a waste heat source via the same coolant loop with which the thermal management system cools the target component.

Figure 1:
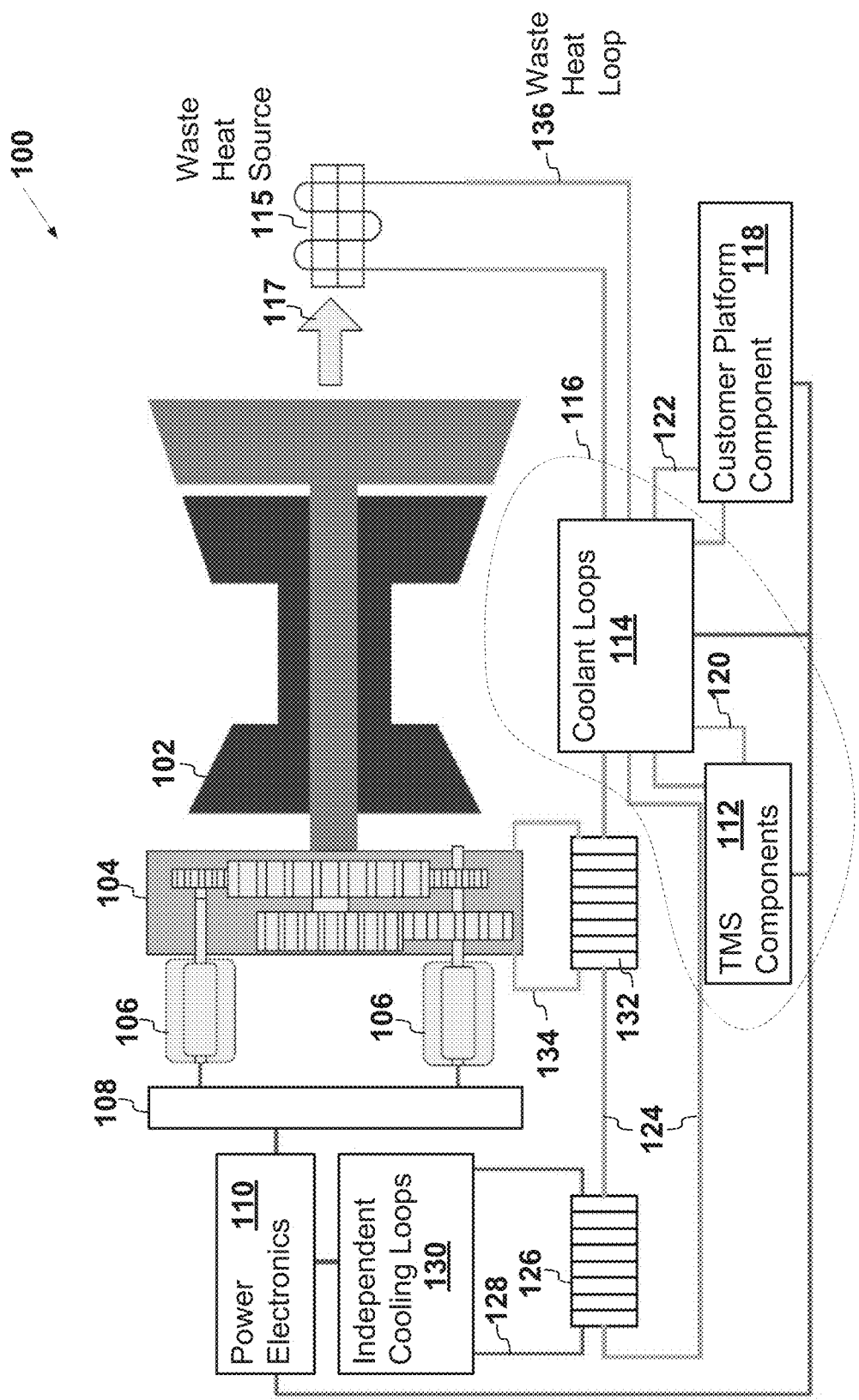
FIG. 1 is a schematic diagram of an example of a system that utilizes waste heat.

FIG. 1 is a schematic diagram of an example of a system 100 that utilizes waste heat. The system 100 may include an engine 102, a gearbox 104, a generator 106 (two generators are shown in FIG. 1), an electrical bus 108 for the generator 106, power electronics 110, thermal management system components 112, thermal management coolant loops 114, and a waste heat source 115.

The waste heat source 115 may include any source of waste heat and/or a component that collects the waste heat from any source of waste heat. For example, the waste heat source 115 in the example of the system 100 shown in FIG. 1 is a heat exchanger in a gas exhaust path 117 of the engine 102. Waste heat is thermal energy rejected from a component as a by-product of operation of the component. In other words, the component may be operated for a primary purpose, and in the process, at least a portion of the thermal energy emitted by the component is unused for the primary purpose. Alternatively or in addition, at least a portion of the thermal energy emitted by the component is unused for any purpose. This unused emitted thermal energy may be the waste heat. In addition to the example in FIG. 1, examples of the waste heat source 115 may include the engine 102, the gearbox 104, the power electronics 110, and/or any other component that generates or collects waste heat.

The engine 102 may include any source of mechanical power that can drive the generator 106. Examples of the engine 102 may include a gas turbine engine, an internal combustion engine, a gas engine, a reciprocating engine, a diesel engine, a turbo fan, any other type of engine, propeller(s) of a wind turbine, and any other source of mechanical power. The engine 102 represented in FIG. 1 is a gas turbine engine.

The gearbox 104 may include any device that performs speed and/or torque conversions from a rotating power source to another device. Examples of the gearbox 104 may include gears, a gear train, a transmission, or any other type of device that performs rotational speed and/or torque conversions. The gearbox 104 may be a drivetrain or be part of a drivetrain.

The generator 106 may include any type of electric generator. Examples of the generator 106 may include a synchronous generator, an induction generator, an asynchronous generator, a permanent magnet synchronous generator, an AC (Alternating Current) generator, a DC (Direct Current) generator, a synchronous generator with stator coils, or any other device that converts mechanical power to electric power.

The electrical bus 108 may include any connector or connectors that conduct electricity. Examples of the electrical bus 108 may include a busbar, a busway, a bus duct, a solid tube, a hollow tube, a wire, an electrical cable, or any other electrical conductor.

The power electronics 110 may include any device or combination of devices that control and/or convert electric power. Examples of the power electronics 110 may include a power converter, a rectifier, an AC to DC converter, a DC to DC converter, a switching device, a diode, a thyristor, an inverter, a transistor, and a capacitor. The power electronics 110 may include semiconductor and/or solid state devices.

The thermal management system components 112 may include any component of a thermal management system. Examples of the thermal management system components 112 may include a thermal energy storage, a vapor cycle system (VCS), a conventional air cycle system (ACS), a compressor, a valve, a gas cooler, a heat exchanger, a recuperator, an evaporator, a condenser, a battery, a coolant pump, a controller, and any other component of any type of cooling system. In some examples, the thermal management system components 112 include the waste heat source 115. The thermal management system components 112 together and/or separately may have a capability to provide cooling and/or heating.

As described in more detail below, the cooling and/or heating provided by the thermal management system components 112 may be distributed by a coolant or refrigerant, such as ethylene glycol and water (EGW), propylene glycol and water (PGW), or R134A, R410, or other refrigerant, through the thermal management coolant loops 114. In more general terms, the combination of the thermal management system components 112 and the thermal management coolant loops 114 form a thermal management system 116. The thermal management system 116 may provide cooling and/or heating to one or more target devices or target components.

During operation of the system 100, the system 100 may provide electrical power to a customer platform component 118. Alternatively or in addition, the system 100 may cool and/or heat the customer platform component 118. The electrical power may by generated by the generator 106 of the system 100 and the cooling and/or the heating may be provided by the thermal management system 116 of the system 100.

The customer platform component 118 may include any device or combination of devices that consumes electricity that may benefit from cooling and/or heating. Examples of the customer platform component 118 may include solid state electronics, a light-emitting diode (LED), an analog circuit, a digital circuit, a computer, a server, a server farm, a data center, a circuit that imposes a hotel load such as vehicle electronics, a circuit that imposes a primary load, a vehicle, an aircraft, a directed-energy weapon, a laser, a plasma weapon, a railgun, a microwave generator, a pulse-powered device, a satellite uplink, an electrically powered machine, an electric motor, and any other electronic device that benefit from heating and/or cooling.

The system 100 may be an integrated power and thermal management system as shown in FIG. 1. An integrated power and thermal management system (IPTMS) is considered "integrated" because electrical power generated by the IPTMS may power devices within the IPTMS, such as components of the thermal management system 116. Alternatively or in addition, the thermal management system 116 may cool and/or heat components of the IPTMS, such as the power electronics 110, the gearbox 104, or any component of the engine 102.

As mentioned above, the cooling and/or heating provided by the thermal management system components 112 may be distributed by a coolant via the thermal management coolant loops 114. The thermal management coolant loops 114 may include independent loops in which coolant is circulated using, for example, pumps. Heat may be exchanged between two independent loops using a heat exchanger, such as a recuperator, an evaporator, or a condenser.

For example, a first loop 120 may be cooled by the thermal management system components 112. The cooled coolant in the first loop 120 may cool a coolant in a second loop 122 via a heat exchanger (not shown). In cooling the coolant in the second loop 122, the coolant in the first loop 120 may become warmer. The warmed coolant in the first loop 120 may be pumped back to the thermal management system components 112 where the coolant is again cooled. Meanwhile, the cooled coolant in the second loop 122 may be pumped to the customer platform component 118 where the coolant cools the customer platform component 118. In cooling the customer platform component 118, the coolant in the second loop 122 may become warmer. The warmed coolant in the second loop 122 may be pumped back to the heat exchanger where the coolant is again cooled by the first loop 120 via the heat exchanger.

In another example, the cooled coolant in the first loop 120 may cool a coolant in a third loop 124 via a heat exchanger (not shown) in a similar manner. The cooled coolant in the third loop 124 may cool the power electronics 110 by passing through a power electronics heat exchanger 126 that cools a coolant in a fourth loop 128. The cooled coolant in the fourth loop 128 may cool the power electronics 110 and/or cool one or more additional independent cooling loops 130 that in turn cool the power electronics 110.

Alternatively or in addition, the cooled coolant in the third loop 124 (or the warmed coolant in the third loop 124 that exits the power electronics heat exchanger 126) may pass through a gearbox heat exchanger 132. The coolant in the third loop 124 that passes through the gearbox heat exchanger 132 may cool oil in an oil loop 134 that flows through the gearbox 104. In such a configuration, the thermal management system 116 may cool the oil in the gearbox 104.

The thermal management coolant loops 114 may include a waste heat loop 136. The waste heat loop 136 may collect the heat from the waste heat source 115 and transport the heat to another component as described later below.

The thermal management coolant loops 114, such as the first loop 120, the second loop 122, the third loop, 124, the fourth loop 128, and the waste heat loop 136 that are illustrated in FIG. 1 are simply examples of the thermal management coolant loops 114. In other examples, the thermal management coolant loops 114 may include additional, fewer, or different coolant loops than shown in FIG. 1. Alternatively or in addition, the thermal management system 116 may cool and/or heat additional, fewer, or different components of the system 100 than shown in FIG. 1.

With respect to generating electrical power, the engine 102 may cause a shaft of the generator 106 to rotate via the gearbox 104 during operation of the system 100. As the shaft of the generator 106 rotates, the generator 106 may generate electricity. The electrical bus 108 may transmit the generated electricity to the power electronics 110. The power electronics 110 may transform, control, and/or store the generated electricity. For example, the power electronics 110 may convert AC current generated by the generator 106 into DC current for delivery to the customer platform component 118. The power electronics 110 may supply electricity to one or more components of the thermal management system 116 and/or to any other component of the system 100.

The system 100 may utilize waste heat to decrease thermalization time. Alternatively or in addition, the system 100 may utilize waste heat to increase a Coefficient of Performance (CoP) of the thermal management system 116 when a thermal load imposed on the thermal management system 116 drops below a threshold level.

Thermalization time is a length of time that the system 100 spends in bringing the system 100 from a storage condition, a transport condition, and/or an "off" condition to operational temperature(s). A thermalization period may be a period of time between a start of the thermalization and a point in time at which the system reaches operational temperature(s). Alternatively, the thermalization period may be a subset of a period of time between a start of the thermalization and a point in time at which the system reaches operational temperature(s). Alternatively or in addition, the thermalization period may be a period of time during a startup of the system 100 (in other words, a startup period). The startup of the system 100 may complete, for example, when the system 100 reaches a steady-state. The thermalization time and the length of the thermalization period may depend on many factors, such as an ambient temperature, temperatures of the components of the system 100 at the start of thermalization, a length of time the system 100 was subjected to the ambient temperature (for example, a cold soak condition), and/or a choice of components of the system 100.

Outside of the thermalization period, the thermal management system 116 may cool a target component via a coolant loop as described above. Examples of the target component may include the customer platform component 118, the gearbox 104, the power electronics 110, and/or any other component. Examples of the coolant loop may include the first loop 120, the second loop t, the third loop, 124, the fourth loop 128, and/or any other coolant loop.

During the thermalization period, the thermal management system 116 may heat the target component with the waste heat source 115 via the same coolant loop with which the thermal management system 116 cools the target component. For example, at the start of the thermalization period, the target component, such as the customer platform component 118, may be cold enough that the target component may not yet operate properly or efficiently. The engine 102 may be started relatively quickly. The started engine 102 may emit exhaust, in the form of relatively hot gases, along the gas exhaust path 117. The waste heat source 115, which is a heat exchanger located in the gas exhaust path 117 in this example, may transfer heat from the exhaust to the coolant in the waste heat loop 136. The thermal management system 116 may pump the heated coolant or refrigerant through the waste heat loop 136 to a heat exchanger (not shown). The heat exchanger may transfer heat from the waste heat loop 136 to the same coolant loop that is used to cool the target component. Alternatively the heat exchanger may transfer heat from the waste heat loop 136 to a coolant loop that is in thermal communication with the same coolant loop that is used to cool the target component.

Figure 2:
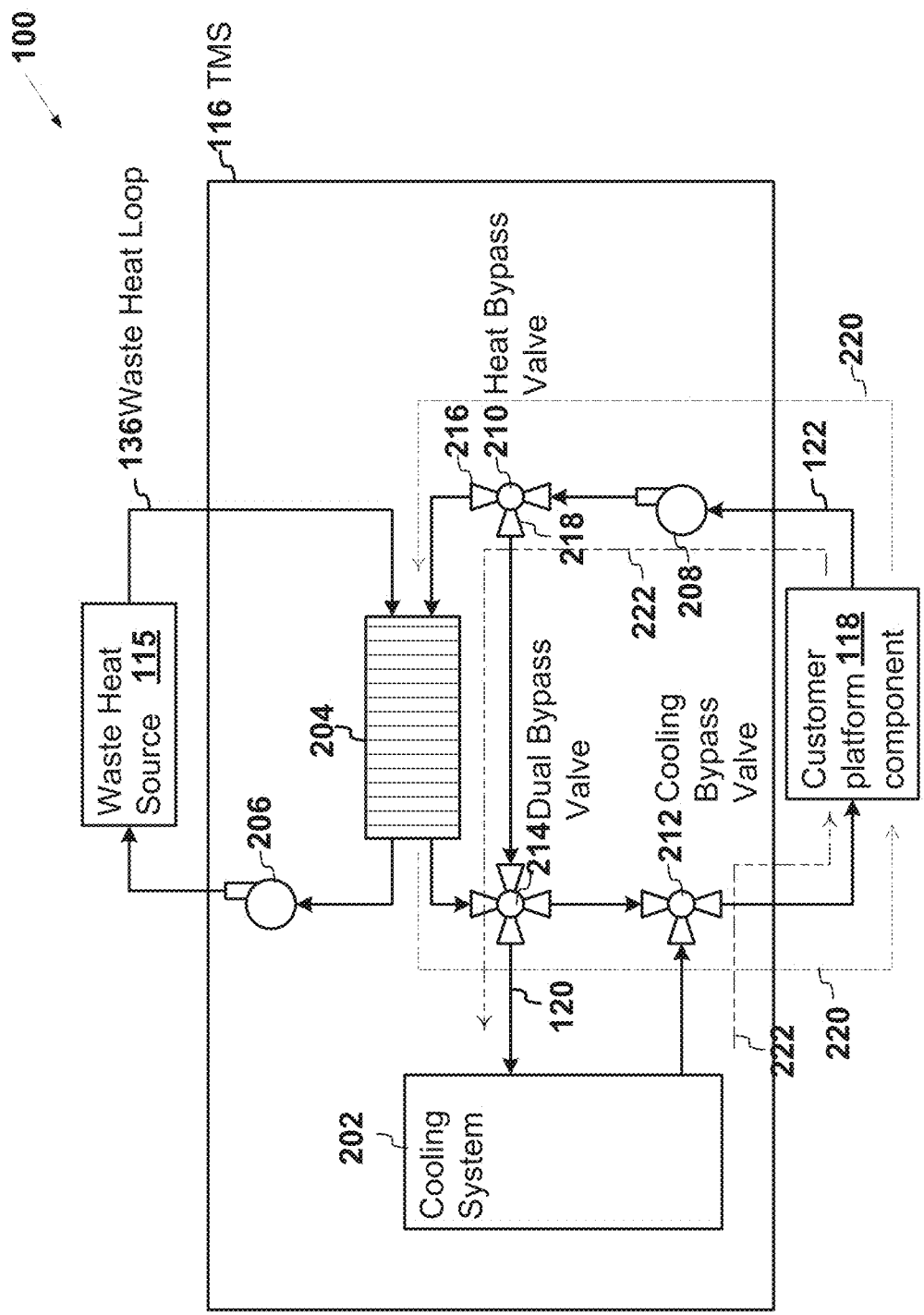
FIG. 2 is a schematic diagram of an example of the thermal management system in which the target component is the customer platform component.

FIG. 2 is a schematic diagram of an example of the thermal management system 116 in which the target component is the customer platform component 118, and the coolant loop that is used to cool the target component is the second loop 122 shown in FIG. 1. The thermal management system 116 may include a cooling system 202, a heat exchanger 204, a waste heat pump 206 for the waste heat loop 136, a target component pump 208 for the second loop 122, a heat bypass valve 210, a cooling bypass valve 212, and a dual bypass valve 214. The cooling system 202 may be any system that provides cooling, such as a vapor cycle system (VCS) system.

At the start of the thermalization period, the target component, which is the customer platform component 118 in this example, may be cold enough that the target component may not yet operate properly or efficiently. The waste heat source 115 may transfer heat to the coolant in the waste heat loop 136. The waste heat pump 206 may pump the heated coolant through the waste heat loop 136 to the heat exchanger 204. The heat exchanger 204 may transfer heat from the waste heat loop 136 to the coolant loop, which is the second loop 122 in this example, for the target component.

The target component pump 208 may pump the coolant through the customer platform component 118 to the heat bypass valve 210. During the thermalization period, the heat bypass valve 210 may direct the coolant on a branch 216 through the heat exchanger 204 so that the waste heat is added to the coolant. Alternatively, when adding waste heat is no longer desired, the heat bypass valve 210 may instead direct the coolant through a bypass branch 218 that bypasses the heat exchanger 204.

The heated coolant that exits the heat exchanger 204 may flow through the dual bypass valve 214. The dual bypass valve 214 may select as an input either the coolant from the heat exchanger 204 or the coolant from the bypass branch 218 that bypasses the heat exchanger 204. During the thermalization period, heat is desired so the dual bypass valve 214 selects the coolant from the heat exchanger 204 as the input. The dual bypass valve 214 may select as an output either the first loop 120 or a branch directed to the customer platform component 118 that flows through the cooling bypass valve 212. During thermalization, the dual bypass valve 214 may select the branch directed to the customer platform component 118 instead of the first loop 120. By selecting the branch directed to the customer platform component 118, the dual bypass valve 214 bypasses the cooling system 202 on the first loop 120.

The heated coolant flows through the cooling bypass valve 212 to the customer platform component 118 where the heat in the coolant is transferred to the customer platform component 118. A path 220 of the coolant in the first loop 120 during the thermalization period is indicated in FIG. 2.

In some examples, the target component pump 208 may pump the coolant in the first loop 120 faster during at least a portion of the thermalization period than the target component pump 208 pumps outside of the thermalization period. The higher speed may provide more heat to the target component.

The dual bypass valve 214 and the cooling bypass valve 212 may act as a switch that switches off flow of the coolant to the cooling system 202 (and/or to any other component of the thermal management system 116) when the coolant is pumped faster. Alternatively, the switch may comprise additional, fewer, or different components than the example illustrated in FIG. 2. Alternatively or in addition, a switch may switch off flow of the coolant to any component of the thermal management system 116 when the coolant is pumped faster if such a component cannot handle the higher flow speed.

As indicated above, the path 220 of the coolant in the first loop 120 during the thermalization period is indicated in FIG. 2. Outside of the thermalization period, a path 222 of the coolant in the first loop 120 is shown in FIG. 2. The coolant in the first loop 120 bypasses the heat exchanger 204 and flows to the cooling system 202, which cools the coolant before the coolant flows back to the customer platform component 118. The first loop 120 and the second loop 122 become the same loop due to the position of the valves 210, 212, and 214.

Outside of the thermalization period, the cooling system 202 and/or the thermal management system 116 may be designed to operate more efficiently when the thermal load imposed by the customer platform component 118 is above a threshold value than when the thermal load imposed by the customer platform component 118 is below the threshold value. Alternatively or in addition, the cooling system 202 and/or the thermal management system 116 may be designed to operate more efficiently when the entire thermal load on the cooling system 202 and/or the thermal management system 116 is above a threshold value than when the entire thermal load is below the threshold value.

In such an example, the thermal management system 116 may increase a coefficient of performance of the thermal management system 116 and/or the cooling system 202 by adding heat from the waste heat source 115 to the coolant in the cooling loop based on a determination that the thermal load imposed on the thermal management system 116 and/or the cooling system 202 drops below the threshold level. For example, the heat bypass valve 210 and the dual bypass valve 214 may cause the coolant to flow through the heat exchanger 204 after flowing through the customer platform component 118. Heat from the waste heat source 115 is therefore added to the coolant on the first loop 120 before the coolant flows to the cooling system 202. The additional heat from the waste heat source 115 may add to thermal load already imposed by the customer platform component 118. The amount of waste heat added may increase the thermal load above the threshold amount and increase the coefficient of performance of the thermal management system 116 and/or the cooling system 202. The path of the coolant when adding the waste heat may be like the path 222 when cooling but include the branch through the heat exchanger 204 instead of the bypass branch 218.

The system 100 may include additional, fewer, or different components than shown in FIG. 1. For example, the system 100 may include additional or fewer heat exchangers than shown in FIG. 1. As another example, the system 100 may not include the additional independent cooling loops 130 that cool the power electronics 110. In still another example, the power electronics 110 may be integrated with the generator 106 so as to eliminate the discrete electrical bus 108 shown in FIG. 1. In yet another example, the system 100 may include a single generator. In some examples, the system 100 may not include the gearbox 104. Instead, the generator 106 may be directly coupled to a mechanical output, such as a shaft, of the engine 102.

Figure 3:
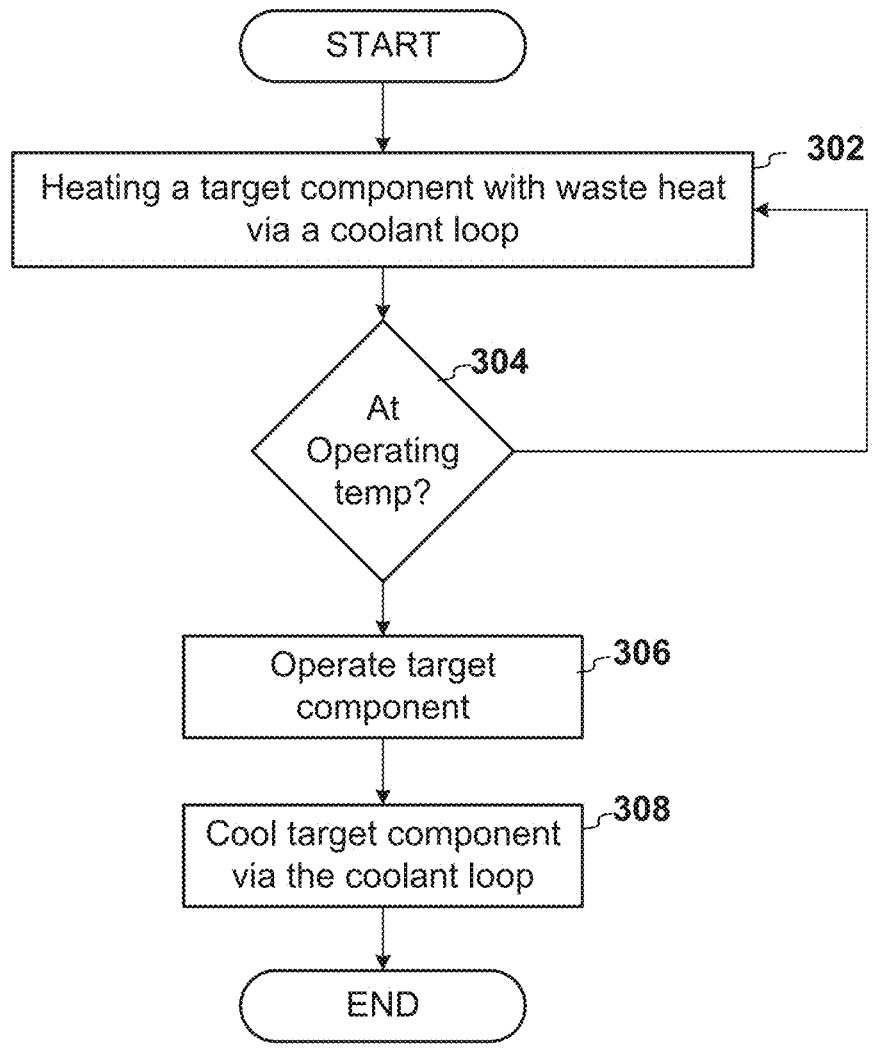
FIG. 3 illustrates a flow diagram of an example logic to utilize waste heat to decrease thermalization time.

FIG. 3 illustrates a flow diagram of an example logic to utilize waste heat to decrease thermalization time. Operations may begin by heating (302) a target component by pumping a coolant through a coolant loop and adding thermal energy obtained from a waste heat source to the coolant.

If the temperature of the system 100 and/or of the target component has not yet reached (304) an operating temperature, operations may return to heating (302) the target component with the waste heat. Alternatively, if the temperature of the system 100 and/or of the target component has reached (304) the operating temperature, then the thermalization period may be complete and the logic may proceed by operating (306) the target component.

As the target component operates (306), operations may proceed by cooling the target component with the coolant in the coolant loop after the thermalization period.

The operations may include additional, different, or fewer operations than illustrated in FIG. 3. The operations may be executed in a different order than illustrated in FIG. 3. For example, the operations may include pumping the coolant through the coolant loop faster when heating the target component than when cooling the target component.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

What is claimed is:

1. A thermal management system comprising:
a coolant loop, the thermal management system configured to cool a gearbox via the coolant loop, the gearbox configured to transfer power from a gas turbine engine to an electric generator, the thermal management system further configured to heat oil in the gearbox during a thermalization period with a waste heat source via the coolant loop with which the thermal management system is configured to cool the gearbox; and
a pump configured to pump a coolant in the coolant loop faster during at least a portion of the thermalization period than outside of the thermalization period.

2. The thermal management system of claim 1 further comprising a switch configured to switch off flow of the coolant to a component of the thermal management system when the coolant is pumped faster during the at least a portion of the thermalization period than outside of the thermalization period.

3. The thermal management system of claim 1, wherein the thermal management system is further configured to cool a directed-energy weapon via the coolant loop.

4. The thermal management system of claim 1, wherein the waste heat source includes a heat exchanger in an exhaust path of an engine.

5. The thermal management system of claim 1, wherein the waste heat source includes power electronics.

6. The thermal management system of claim 1, wherein the thermal management system is configured to increase a coefficient of performance of the thermal management system by addition of heat to a coolant in the cooling loop from the waste heat source in response to thermal load on the thermal management system being below a threshold level.

7. A method of decreasing thermalization time, the method comprising:
heating a target component by pumping a coolant through a coolant loop during a thermalization period, the coolant comprising thermal energy obtained from a waste heat source;
cooling the target component with the coolant in the coolant loop after the thermalization period;
adding, outside of the thermalization period, waste heat from the waste heat source to the coolant after the coolant passes through the target component but before the coolant is cooled by a cooling system; and
pumping the coolant through the coolant loop faster when heating the target component than when cooling the target component.

8. The method of claim 7 further comprising switching off a flow of the coolant to a component of a thermal management system when pumping the coolant through the coolant loop faster.

9. The method of claim 7, wherein the heating the target component includes heating oil that flows through a gearbox, wherein the gearbox is configured to transfer power from a gas turbine engine to an electric generator, and wherein the cooling the target component includes cooling the oil that flows through the gearbox.

10. The method of claim 7, wherein at a start of the thermalization period, a temperature of the target component is below an operating temperature of the target component.

11. An integrated power and thermal management system, the integrated power and thermal management system comprising:
- an electric generator configured to generate electricity for a directed-energy weapon;
- an engine configured to power the electric generator;
- a thermal management system comprising a coolant loop, a cooling system, and a heat exchanger, wherein the heat exchanger is arranged on the coolant loop between the directed-energy weapon and the cooling system, and wherein the heat exchanger is configured to add waste heat to coolant in the coolant loop as the coolant passes from the directed-energy weapon to the cooling system, the thermal management system configured to cool a target component via the coolant loop, the thermal management system further configured to heat the target component with a waste heat source via the coolant loop, wherein the target component includes the directed-energy weapon; and
- a bypass valve, the bypass valve configured to selectively direct the coolant in the coolant loop received from the directed-energy weapon to either the heat exchanger or a branch that bypasses the heat exchanger based on a determination that a thermal load on the thermal management system is above or below a threshold value.

12. The integrated power and thermal management system of claim 11, wherein the electric generator is configured to generate electricity for a component of the thermal management system.

13. The integrated power and thermal management system of claim 11, wherein the directed-energy weapon includes a pulsed-powered device.

14. The integrated power and thermal management system of claim 11 further comprising a gearbox between the engine and the electric generator, wherein the target component includes the gearbox.

* * * * *